US012752526B2

(12) United States Patent
Sick et al.

(10) Patent No.: US 12,752,526 B2
(45) Date of Patent: Oct. 6, 2026

(54) METHOD OF MAKING ARTIFICIAL TURF

(71) Applicants: Synthetic Turf Resources, Dalton, GA (US); Polytex Sportbelage Produktions-GmbH, Grefrath (DE)

(72) Inventors: Stephan Sick, Baden-Baden (DE); Thorsten Van Den Berg, Essen (DE); Dario Grochla, Bochum (DE)

(73) Assignees: Polytex Sportbeläge Produktions-GMBH, Grefrath (DE); Synthetic Turf Resources, Dalton, GA (US)

( * ) Notice: Subject to any disclaimer, the term of this patent is extended or adjusted under 35 U.S.C. 154(b) by 270 days.

(21) Appl. No.: 18/486,723

(22) Filed: Oct. 13, 2023

(65) Prior Publication Data

US 2025/0100265 A1 Mar. 27, 2025

(30) Foreign Application Priority Data

Sep. 21, 2023 (EP) .................................... 23198678

(51) Int. Cl.
*B32B 37/15* (2006.01)
*B32B 5/02* (2006.01)
(Continued)

(52) U.S. Cl.
CPC .............. *B32B 37/15* (2013.01); *B32B 5/028* (2013.01); *B32B 5/18* (2013.01); *B32B 5/245* (2013.01);
(Continued)

(58) Field of Classification Search
CPC ........... E01C 13/08; B32B 5/028; B32B 5/18; B32B 5/245; B32B 2266/0278; B32B 2305/022
See application file for complete search history.

(56) References Cited

U.S. PATENT DOCUMENTS 8,957,121 B2 * 2/2015 Schiller .................. C08G 18/48 521/137
2009/0062432 A1 3/2009 Doesburg et al.
2010/0086708 A1 4/2010 Jenkines et al.

FOREIGN PATENT DOCUMENTS

CA 3224454 * 1/2023 ............ C08G 18/16
CN 116063975 A 5/2023
(Continued)

OTHER PUBLICATIONS

Synthetic Grass Warehouse, “What is Polyurethane Backing?” Jan. 31, 2023, 4 pages.*
(Continued)

*Primary Examiner* — Bret P Chen
(74) *Attorney, Agent, or Firm* — Harness, Dickey & Pierce, P.L.C.

(57) ABSTRACT

A method for making an artificial turf, the method comprising:

- providing a carrier (308) and an artificial turf fiber (501) incorporated into the carrier such that a first portion of the artificial turf fiber (506) protrudes to a back side of the carrier, a second portion of the artificial turf fiber (302) protrudes to a front side of the carrier, and a third portion of the artificial turf fiber (504) is inside the carrier;
- preparing a polyurethane (PU) foam reaction mixture (210) containing a reactive foam stabilizer (RFS),
- applying the PU foam reaction mixture on the back side of the carrier (308) to cover the artificial turf fiber (506) protruding to the back side of the carrier (308) and hardening the PU foam reaction mixture to form a flexible PU backing securing the turf fiber in place.

14 Claims, 6 Drawing Sheets

(51) Int. Cl.

| | |
|---|---|
| ***B32B 5/18*** | (2006.01) |
| ***B32B 5/24*** | (2006.01) |
| ***E01C 13/08*** | (2006.01) |

(52) U.S. Cl.

CPC ...... *E01C 13/08* (2013.01); *B32B 2266/0278* (2013.01); *B32B 2305/022* (2013.01); *B32B 2305/18* (2013.01)

(56) References Cited

FOREIGN PATENT DOCUMENTS

| | | | | |
|---|---|---|---|---|
| DE | 102009013948 | * | 9/2010 | ............... D06N 7/00 |
| EP | 3315640 | * | 5/2018 | ............... D01F 6/46 |
| EP | 3536735 | * | 9/2019 | ............. C08G 77/46 |
| JP | 2022-92612 | * | 6/2022 | ............. C08G 77/46 |
| KR | 10-2018-0070868 | * | 6/2018 | ................ C08J 7/04 |
| WO | 01/25184 A1 | | 4/2001 | |
| WO | 2004/096882 A1 | | 11/2004 | |

OTHER PUBLICATIONS

"Chemistry and Technology of Polyols for Polyurethanes," 2nd Edition, vol. 2, pp. 166-179.

International Search Report for PCT/EP2024/069922 dated May 23, 2025.

Search Report for European Application No. 23198678.7 dated Jun. 4, 2024.

Office Action for European Application No. 23 198 678.7 dated Nov. 3, 2025.

* cited by examiner

METHOD OF MAKING ARTIFICIAL TURF

CROSS-REFERENCE TO RELATED APPLICATIONS

This application claims priority to and the benefit of European Patent Application No. 23198678.7 filed on Sep. 21, 2023, the entire contents of each of which are incorporated herein by reference.

FIELD OF THE INVENTION

The invention relates generally to a method for making an artificial turf, and the artificial turf made by this method.

BACKGROUND AND RELATED ART

Use of artificial turf is increasing because it is easier to maintain than natural turf and its surface characteristics are in many respects better than those of natural turf. Typically, artificial turf is manufactured by extruding a thermoplastic resin to produce artificial turf fiber which is attached on a carrier via a process known as tufting. The polymer fibers on the surface of the artificial turf are in the form of loops or individual needles often referred to as blades or piles. Often, a polymer resin is applied on the back side of the carrier for enhancing the structural stability and the pile pulling characteristics of the artificial turf. Artificial turf is used in many applications including household floor matting, playing surface for sports such as soccer, football, rugby, tennis, golf, exercise fields, landscaping applications and the like.

The production of artificial turf fibers often turns out to be a technical challenge, as various problems can occur which may affect the quality of the artificial turf.

Hence, further improvements are needed in the manufacturing process for providing artificial turf surfaces with satisfactory performance characteristics.

SUMMARY OF THE INVENTION

The invention provides for a method of manufacturing an artificial turf and an artificial turf made by the manufacturing method as specified in the independent claims. Embodiments are given in the dependent claims. Embodiments and examples disclosed herein may be freely combined with each other if they are not mutually exclusive.

An aspect of the invention is directed to a method for making an artificial turf, the method comprising: providing a carrier and an artificial turf fiber incorporated into the carrier. The fiber may be preferably incorporated inside the carrier such that a first portion of the artificial turf fiber protrudes to a back side of the carrier, a second portion of the artificial turf fiber protrudes to a front side of the carrier, and a third portion of the artificial turf fiber is inside the carrier. The method further comprises preparing a polyurethane (PU) foam reaction mixture and applying the PU foam reaction mixture on the back side of the carrier to cover the artificial turf fiber (506) protruding to the back side of the carrier and allowing the PU foam reaction mixture to harden to form a flexible PU backing securing the turf fiber in place. The PU foam reaction mixture contains a reactive foam stabilizer (RFS) for stabilizing the PU foam reaction mixture.

The PU backing obtained by the inventive method may have the following advantages:

- improved tensile strength and improved tuft bind (also known as tuft lock), thus imparting improved properties for the artificial turf.
- satisfactory tuft bind with less PU backing.
- high dimensional stability, thus making a particularly dimensionally stable artificial turf that expands or contracts less with large temperature differences that occur frequently in outdoor areas.
- achieving a desired degree of dimensional stability or elasticity with significantly less PU mass, because the viscosity of the liquid PU reaction mixture, which is actually a foam, is significantly increased in this special formulation, so that the foam is better stabilized until it has hardened/cured/completed reacting into the PU-matrix. The foam does not collapse as quickly because of the increased viscosity.

Also, due to the improved stability of the PU reaction mixture foam until the PU reaction mixture hardens, more additives, especially pigments, can be added to the back coating without the foam collapsing. Furthermore, an improved, homogeneous mixing of the back coating reaction compound with the pigments is made possible and segregation of the heavy pigments because of gravity is significantly reduced or prevented. Use of the RFS further allows forming a stable PU reaction mixture foam even when the PU reaction mixture may comprise impurities or polyol compounds of the type which may destabilize the PU foam. This is particularly beneficial for allowing the use of biobased polyols which have been observed to be linked to less stable PU foam;

The RFS may be bio-based and may be at least one of the following substances:

- a polyester polyol, in particular a polyester diol or polyester triol, based on soybean oil, and/or castor oil, and/or
- a fat in the form of an ester of a triol with a fatty acid, in particular a triglyceride, and more in particular castor oil, and/or soybean oil.

Although the inventors do not wish to be bound by theory, it is postulated that the RFS stabilizes the PU foam reaction mixture via hydrogen bonding. This way higher viscosity in the PU foam reaction mixture is possible without higher compound viscosity.

In an embodiment, the RFS may be chemically modified for increasing the number of hydroxyl groups so that more covalent bonds are created with the PU matrix.

The RFS may be added to the PU foam reaction mixture in one of the components of the PU foam reaction mixture including the polyol, the isocyanate, or an additive. Preferably, the RFS is added within a color paste additive that is added in the reaction mixture. More preferably, the RFS is added in the reaction mixture before the isocyanate component has been added in the reaction mixture. It has been found that adding the RFS in the reaction mixture before the isocyanate compound has been added in the reaction mixture is beneficial because it allows for improved control of the viscosity of the reaction mixture and may prevent an excessive increase in the viscosity of the reaction mixture.

In an embodiment, the color paste may comprise of 7% to 60%, or 10% to 50%, or 15% to 45%, or 20% to 40%, or 25% to 30% by weight pigment (also referred to as color), and 40% to 93%, or 50% to 90%, or 55% to 85%, or 60% to 80%, or 70% to 75% RFS.

The PU foam reaction mixture applied to the carrier may comprise of 1 to 9, or 2 to 6, or 3-5 parts by weight of the color paste, 70 to 120, or 80 to 110, or 90 to 110 parts by weight of a polyol blend, and 7 to 21, or 10 to 18, or 12 to 16 parts by weight of isocyanate. Polyol blend refers to a polyol compounded with a filler and in some embodiments with a chain extender.

In an embodiment, the PU foam reaction mixture applied to the carrier may comprise 3 parts by weight of the color paste, 100 parts by weight of the polyol blend and 14 parts by weight of isocyanate.

The part ratios of the polyol component and isocyanate component may vary depending on the type of polyol or isocyanate used.

The polyol blend may comprise from 30 to 80 wt % filler and from 70 to 20 wt % polyol. In an embodiment, the polyol blend may comprise one part of a polyol and two parts filler. The polyol and the filler may be compounded together before added to the PU reaction mixture. In an embodiment, the polyol blend may further include a chain extender.

Preparing the PU foam reaction mixture may further comprise adding to the compounded polyol with the filler, a color paste with the RFS and an isocyanate to form a viscous mixture.

In an embodiment, the preparation of the PU foam reaction mixture may comprise first compounding the polyol with the filler, and then adding the color paste with the RFS dispersed in the color paste in a manifold of a polyurethane machine. The manifold may then unify the compounded material (polyol with the filler) with the added color paste (with the RFS) and optionally any added surfactant/catalyst (if appropriate). Pressurized air for mechanical foam creation (or frothing) may be injected in the manifold. The manifold may lead to a mixing head where the isocyanate is added to produce the PU foam reaction mixture.

One or more additives may be added in the mixture while mixing to form a homogeneous stable foam reaction mixture, and the homogeneous stable foam reaction mixture may be then applied on the back side of a carrier and allowed to solidify to form the backing of an artificial turf. The RFS is used in an effective amount to adequately stabilize the PU foam reaction mixture, thus forming a homogeneous PU backing that stays homogeneous till the hardening of the PU foam reaction mixture. The stabilized PU foam may also prevent any settling of any of the additives.

Another aspect of the invention is directed to an artificial turf comprising a carrier and an artificial turf fiber incorporated into the carrier such that a first portion of the artificial turf fiber protrudes to a back side of the carrier, a second portion of the artificial turf fiber protrudes to a front side of the carrier, and a third portion of the artificial turf fiber is inside the carrier. The artificial turf further comprises a flexible polyurethane (PU) foam backing with a PU matrix being the reaction product of a PU polymerization reaction wherein an RFS was added in the polymerization reaction mixture, and wherein the PU backing covers the artificial turf fiber protruding to the back side of the carrier for securing the turf fiber in place.

According to another aspect of the present invention, an artificial turf polyurethane backing kit is provided comprising a polyol blend with filler and additives, an isocyanate component, and a color paste component, wherein one of the components, preferably, the polyol blend, or more preferably the color paste component contains an RFS selected from the group consisting of:

- a polyester polyol, in particular a polyester diol or polyester triol, in particular a polyester polyol based on soybean oil, and/or castor oil, and/or
- a fat in the form of an ester of a triol with a fatty acid, in particular a triglyceride, in particular castor oil and/or soybean oil.

The flexible polyurethane (PU) foam backing exhibits improved tensile strength, improved tuft bind, and improved dimensional stability.

The color paste may comprise any suitable pigment. Preferably, the color paste may comprise a green color pigment paste. Examples of a green color pigment include phthalocyanine green, chromium oxide green pigment, chrome green pigment, and mixtures thereof. Preferably, the color paste may also comprise an organic green pigment.

In some embodiments, the color pigment may include phthalocyanine green and/or phthalocyanine blue, preferably phthalocyanine green. Phthalocyanine green G is also known as phthalo green, viridian hue, pigment green 7 and its chemical formula is $C_{32}Cl_{16}CuN_8$.

The PU backing may have any suitable thickness. In an embodiment the PU backing may have a thickness of 0.1 mm to 5.0 mm, or 0.1 mm to 4.0 mm, or 0.1 mm to 2.0 mm, and a tuft bind of at least 10 Newtons, or at least 15 Newtons, or 10 Newtons to 30 Newtons, or 15 Newtons to 30 Newtons.

The turf fibers may be made of any suitable polymer material including, for example, polyamide, polypropylene, polyethylene, and various grades thereof. Preferably, the turf fibers may be made of hydrophobic polyethylene selected from the group consisting of polyethylene homopolymer, LLDPE, HDPE, polyethylene alloy, and polyethylene copolymer. The fibers may have different shapes and configurations such as, for example, monofilament, slit film, or fibrillated.

Incorporating the turf fibers into the carrier includes positioning the fiber so that a first portion of the fiber is located at the back side of the carrier (also referred to hereinafter as the back portion of the fiber), a second portion of the fiber is protruding to the front side of the carrier (also referred to hereinafter as the front portion of the fiber) and a third portion of the fiber is inside the carrier (referred to also as the middle portion of the fiber or the carrier portion of the fiber).

These and other features and advantages of the present invention will become better understood from the following detailed description of the invention in conjunction with the accompanying drawings

DETAILED DESCRIPTION OF THE INVENTION

Various embodiments of the present invention will be described in greater detail with reference to the accompanying drawings. Like numbered elements in the figures are either equivalent elements or perform the same function. Elements which have been discussed previously will not necessarily be discussed in later figures if the function is equivalent.

Figure 1A:
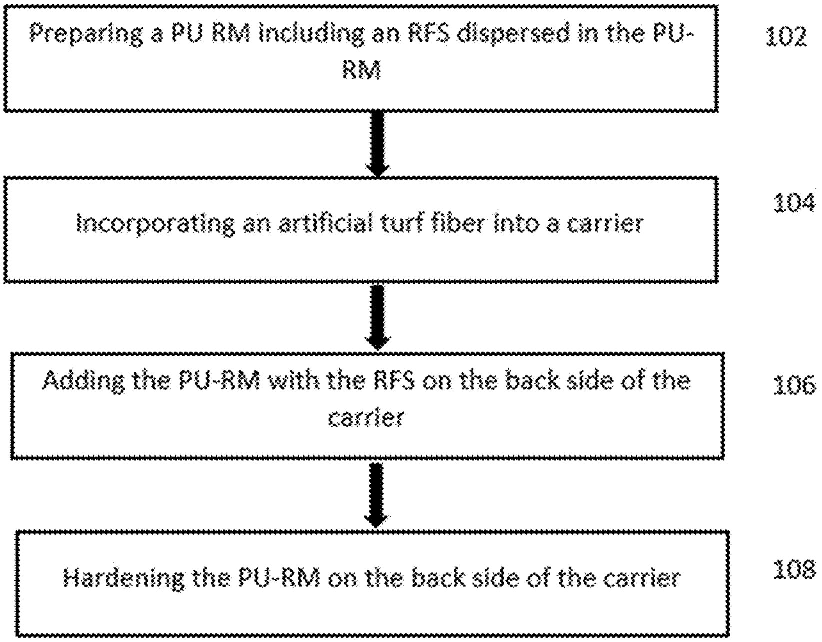
FIGS. 1A and 1B are flowcharts of a method of manufacturing of an artificial turf with an RFS in the polyurethane backing, according to an embodiment of the present invention.

Referring to FIG. 1A, a method for manufacturing an artificial turf is provided, the method comprising preparing a first polyurethane reaction mixture (PU-RM) including a reaction foam stabilizer (RFS) dispersed in the polyurethane reaction mixture in step 102, incorporating an artificial turf fiber into a carrier in step 104, adding the fluid (viscous) polyurethane reaction mixture with the RFS on the back side of the carrier in step 106, and hardening the polyurethane reaction mixture in step 108 to form a polyurethane backing, wherein the method is characterized in that an effective amount of the RFS is added in the polyurethane reaction mixture for stabilizing the polyurethane foam reaction mixture. The stabilized PU reaction mixture may prevent the settling out of any additives added in the mixture before it is applied on the back side of the carrier and hardened. The RFS is added and dispersed via mixing inside the polyurethane reaction mixture before the polyurethane reaction mixture is applied on the back side of the carrier. Once the polyurethane reaction mixture is placed on the back side of the carrier, hardening of the polyurethane reaction mixture is performed to form a solid polyurethane backing with a portion of the turf fiber which protrudes out of the back side of the carrier being securely embedded inside the solid mass of the polyurethane backing. The polyurethane backing enhances the structural strength of the artificial turf and the fiber pulling characteristic of the turf fiber.

Figure 1B:
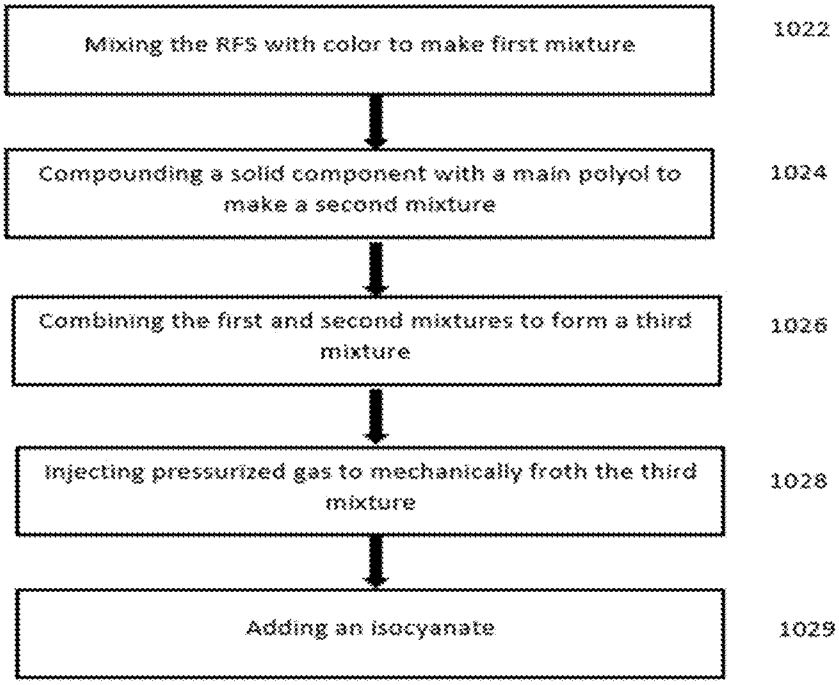

Referring now to FIG. 1B the preparation of the polyurethane reaction mixture with the RFS may comprise mixing the RFS compound with a color paste in step 1022 to make a first mixture, compounding a solid component with a main polyol in step 1024 to make a second mixture, adding the first mixture and second mixture together in step 1026 to create a third mixture, and injecting pressurized air in step 1028 inside the third mixture for mechanically frothing the third mixture. The method further comprises adding an isocyanate in step 1029.

In the compounding step 1024 two or more solid components may be compounded together. For example, chalk as filler and zeolite as a drying agent may be added as the solid components. Up to 3 liquid components including the main polyol and in an embodiment a chain extender, catalyst/additive or similar compounds may be added. The step 1024 may be performed in a polyurethane machine comprising a manifold where the first mix (compounded material from step 1022 including the color, and the RFS) and a surfactant and a catalyst, if needed, are added and mixed. The pressurized air is added in step 1028 for foaming the mixture. The third mixture from the manifold is transferred to a mixing head where an isocyanate is added. Mixing in the mixing head with the addition of pressurized air produces a foam of the reactive polyurethane mixture mass.

The RFS may be a bio-based polyol based on natural vegetable oil, preferably, soybean oil, or castor oil, or mixtures thereof with a nominal functionality of 2 or greater. The bio-based polyol can be used in its natural form or may be modified.

Polyester polyol based on soybean oil and/or castor oil refers to a polyester polyol formed from the soybean oil, and/or the castor oil via a transesterification reaction wherein the triglycerides in the soybean oil, and/or the castor oil are reacted with a polyhydric alcohol such as glycerol or pentaerythrol to produce polyester polyols. The transesterification reaction breaks down the triglycerides, and the fatty acids are exchanged for hydroxyl (OH) groups from the polyhydric alcohol, resulting in the formation of polyester polyols.

The castor oil or soybean oil may be extracted from plant material essentially without introducing chemical modifications by crushing or pressing the castor bean seeds or the soybean seeds respectively. The process may include mixing the crushed seeds with a solvent that dissolves the castor oil present in the seeds creating a mixture of castor oil and solvent. The mixture is then separated by passing it through a distillation column where the solvent is evaporated and the castor oil is retrieved as liquid from the bottom of the column. The retrieved oil may then be refined through well-known refining processes.

Castor oil is a triglyceride with a glycerol backbone with each of its three hydroxyl groups esterified with a fatty acid. The main fatty acid is ricinoleic acid which is a unique fatty acid found almost exclusively in castor oil and accounts for about 85 to 95% of the total fatty acids in the oil. Other fatty acids present in the castor oil are oleic acid, linoleic acid, and stearic acid.

The chemical structure of soybean oil triglycerides is represented as follows:

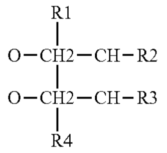

In this structure, R1, R2, and R3 represent different fatty acid chains, and the glycerol backbone is represented as R4.

Since soybean oil contains a mixture of fatty acids, the triglycerides present in the oil will have different combinations of these fatty acids. The proportions of the different fatty acids in soybean oil may vary depending on factors like the soybean variety and processing methods used to extract the oil. The major fatty acids found in soybean oil include oleic acid, linoleic acid, palmitic acid, and stearic acid.

In other embodiments, the castor oil and soybean oil may be chemically modified Chemical modification may include transesterification with polyols with high functionality and high OH #. Suitable polyols for such modification may include glycerol, trimethylopropane (TMP), pentaerythritol (PER) sorbitol, sucrose, and the like, and the reaction may take place in the presence of an alkali alcoholate catalyst such as sodium methoxide or potassium methoxide. Transesterification of castor oil may generate mono, di and triglycerides of ricinoleic acid having a much higher OH # than the castor oil. Chemistry and Technology of Polyols for Polyurethanes, $2^{nd}$ Edition, Volume 2, pages 168-169.

According to an embodiment, the transesterification reaction can be performed in the form of a thermal transesterification or an enzymatic transesterification. Using enzyme-based transesterification may have the advantage that the transesterification reaction is highly specific and a defined type of ester will be obtained from defined educts. Thermal transesterification often generates a heterogeneous mixture of products, but has the advantage of being more robust against proteases, heat and other factors which may have a negative impact on enzymatic activity.

The addition of the bio-polyol over the color is advantageous because it allows controlling the rate of crosslinking/plasticization while also improving foam stability without having to change the process layout. It also prevents processing problems because of excessive viscosity.

Preferably, the polyurethane reaction mixture enters inside the carrier structure before it is fully solidified. Depending on the structure of the carrier, the viscosity of the polyurethane reaction mixture, and the rate of the solidification of the polyurethane reaction mixture, the polyurethane reaction mixture can enter deeper inside the carrier to better secure the turf fibers in place. The backing may further include various agents such as antimicrobial agents or cooling agents (e.g., a phase change material) and allowing the PU reaction mixture to enter deeper into the carrier may be beneficial for allowing these agents to also be distributed within the carrier. In some other embodiments the polyurethane reaction mixture, before it is fully solidified, may enter through the carrier to also form a thin coating on a front side of the carrier, thus fully covering both the back side and the front side of the carrier and also filling any voids inside the carrier.

Figure 2:
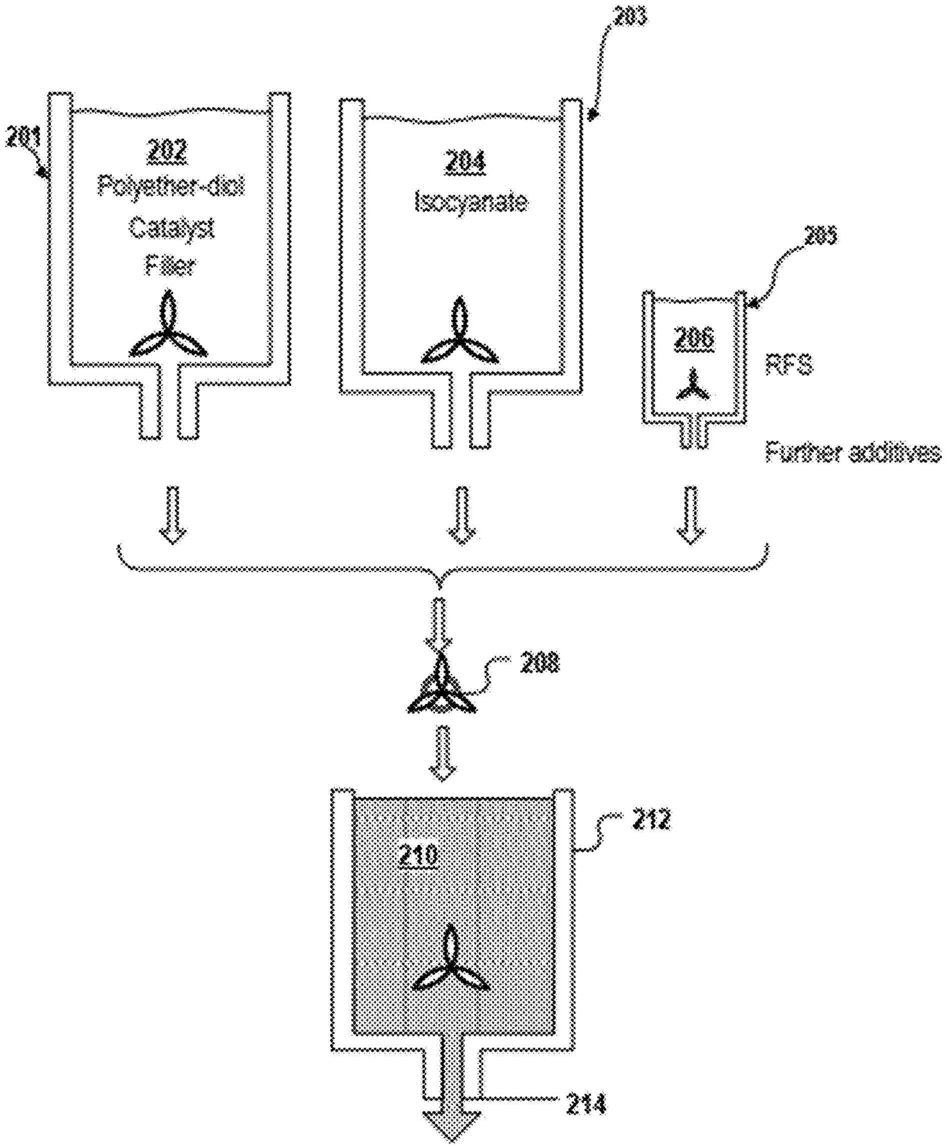
FIG. 2 illustrates a simplified block diagram of a process for forming a polyurethane reaction mixture for the backing of the artificial turf, according to an embodiment of the present invention.

FIG. 2 illustrates multiple tanks and mixers comprising educts for creating the polyurethane reaction mixture according to an example. A first mixing unit 201 (also referred to as first tank or first container) is used for creating a first mixture 202 (also referred to as the polyol blend) comprising the polyether polyol or the polyester polyol. For example, the first mixture 202 comprises a polyether-polyol, e.g., a polyether-polyol having a number average molecular weight of about 4000 Da, e.g., a polyol based on polymerized propylene oxide. The polyether polyol may be obtained e.g., in the form of a ready-made polyol.

The first mixture 202 may be a polyether polyol and/or a polyester polyol having at least 2 hydroxyl groups per molecule. Examples of polyether polyols may include polyethylene glycol (PEG), polypropylene glycol (PPG), and polytetramethylene ether glycol (PTMEG). Examples of polyester polyols may include polyethylene adipate, polycaprolactone polyol, and polybutylene adipate terephthalate. The first mixture 202 may further include a chain extender. The chain extender may be, for example, MEG (monoethylene glycol), DEG (diethylene glycol), TEG (triethylene glycol), MPG (monopropylene glycol), DPG (dipropylene glycol), TPG (tripropylene glycol), BDO (1,4-butanediol), butanetriol (also known as 1,2,4-butanetriol), 1,4-cyclohexanedimethanol (CHDM), and the like. The chain extender may be used in an amount of 5 to 50 wt % of the total amount 5 to 50 wt % of the total amount of the first mixture 202.

In an embodiment, the first mixture 202 may comprise PPG 450 to 6000 Da, and a chain extender in an amount of 5 to 50 wt % of the total amount of the polyol blend.

In an embodiment, the first mixture 202 may comprise the following polyols: 85% polyethylene glycol 4000 Da (or polyethylene glycol 2000 Da) and 15% dipropylene glycol (DPG), and a chain extender in an amount of 5 to 50 wt % of the total amount of the polyol blend.

In an embodiment, the first mixture 202 may comprise a filler material. Adding a filler may reduce the cost and/or help to achieve a particular look or weight. Fillers can be, for example selected from the group ground limestone, chalk (precipitated calcium carbonate), China clay, coal fly ash, silicates and other inert material including non-reactive liquids. Moreover, fillers with flame retardant and/or intumescent efficiency like aluminum hydroxide ($Al(OH)_3$) or ammonium polyphosphate ($NH_4PO_3]_n(OH)_2$) may be used or mixtures of the aforementioned fillers. In an embodiment the filler may be chalk.

The first mixture may optionally include other substances such as a catalyst, anti-settling agent, wetting agent, dispersing agent, drying agent such as zeolite.

For example, the first mixture 202 may comprise a catalyst for boosting the polyaddition reaction that generates the polyurethane. The catalyst can be, for example, amine compounds and metal-organo complexes. Traditional amine catalysts have been tertiary amines such as triethylenediamine (TEDA, 1,4-diazabicyclo[2.2.2] octane or DABCO), dimethylcyclohexylamine (DMCHA), and dimethylethanolamine (DMEA). Metal-organo complexes used as polyurethane catalysts can be based, for example, on mercury (e.g., mercury carboxylates), lead, tin (e.g., alkyl tin carboxylates and oxides), bismuth, and zinc (e.g., bismuth and zinc carboxylates). The first mixture is then stored in the first tank 201, e.g., a day tank, i.e., a tank sized to provide a day's worth of usage.

For example, a mixture of tin organic and an amine catalyst may be used. Suitable amines include, for example, Cyclohexyldimethylamine, 2-dimethylaminoethanol, 4-ethylmorpholine, N,N,4-trimethylpiperazine-1-ethylamine, 1,4-dimethylpiperazine, 3-aminopropyldimethylamine, 2,2'-iminodiethanol, 1-methylimidazole, 1,2-dimethylimidazole, 2-[[2-(dimethylamino)ethyl] methylamino]ethanol, N-[3-(dimethylamino) propyl]-N,N',N'-trimethylpropane-1,3-diamine, formic acid, compound with 2,2'-oxybis[N,N-dimethylethylamine] (2:1), 1,1'-[[3-(dimethylamino) propyl] imino]bispropan-2-ol, +2-[(2-[2-(dimethylamino) ethoxy] ethyl)methylamino]ethanol, Benzyldimethylamine 4-methylmorpholine, N,N,N',N'-tetramethylhexamethylenediamine, 2-[2-(dimethylamino) ethoxy]ethanol, 1,4-diazabicyclooctane, Bis(2-dimethylaminoethyl)(methyl) amine, N,N,N',N'-tetramethyl-2,2'-oxybis(ethylamine, 2,2'-dimorpholinyldiethyl ether, 1,8-diazabicyclo[5.4.0]undec-7-ene, N'-[3-(dimethylamino) propyl]-N,N-dimethylpropane-1,3-diamine, N,N,N',N',N",N"-hexamethyl-1,3,5-triazine-1,3,5 (2H,4H,6H)-tripropanamine, and N,N-bis[3-(dimethylamino) propyl]-N',N'-dimethylpropane-1,3-diamine.

In an embodiment, the polyurethane may be the reaction product of first and second polyols with an isocyanate, wherein the first polyol is polyether polyol and/or polyester polyol having at least 2 hydroxyl groups per molecule, wherein the second polyol is polybutadiene diol (PBD), wherein the isocyanate comprises isocyanate monomers, isocyanate polymers or isocyanate prepolymers or a mixture thereof, and wherein the isocyanate monomers, the isocyanate polymers and the isocyanate prepolymers have two or more isocyanate groups per molecule.

The second mixture 204, i.e., the isocyanate monomer/polymer/prepolymers mixture, e.g., MDI, is stored in a second tank 203 that is preferably also a day tank. A further container 205 that is typically of a smaller size than the first and second tanks comprises a third substance mixture 206 including the RFS, preferably dispersed within the color paste ("Color").

In the embodiment illustrated in FIG. 2, PBD may optionally also be added in the third substance mixture 206, however, it should be understood that in other embodiments no PBD is added.

Optionally other agents and substances such as an antimicrobial agent, a wetting agent, pale oil and/or one or more further additives may be added. The one or more further additives may be, for example, flame retardants, extenders, cross linkers, blowing agents and the like. The containers 201, 203, and 205 may be part of or coupled to a mixing head 208. The mixing head 208 may receive the first mixture 202 from the first container 201, the second mixture 204 from the second container 203 and the color paste with the RFS, optionally the PBD and the one or more optional substances (wetting agent, pale oil and/or further additives) from the third container 205. The mixing head 208 may blend the first, second and third mixtures received from the respective containers (or tanks) in suitable amounts for forming a polyurethane reaction mixture 210 having substance concentrations within the ranges specified herein for the various embodiments of the invention. For example, the first, second and third mixtures are blended such that the number of OH groups in the first polyol molecules in the first mixture in combination with the number of OH groups in the PBD molecules in the third mixture will roughly correspond (e.g., in a range of ratios ranging from "0.9:1" to "1:0.9") to the number of NCO groups in the isocyanate molecules (monomers and prepolymers).

In an embodiment, the color paste may comprise of 7% to 60%, or 10% to 50%, or 15% to 45%, or 20% to 40%, or 25% to 30% by weight pigment, and 40% to 93%, or 50% to 90%, or 55% to 85%, or 60% to 80%, or 70% to 75% RFS and may be added by the mixing head 208 to the reaction mixture 210 in such an amount that it may comprise 0.5, to 9, or 1 to 6, or 2 to 4 parts by weight of the color paste, 70 to 120, or 80 to 110, or 90 to 110 parts by weight of the polyol blend and 7 to 21, or 10 to 18, or 12 to 16 parts by weight of isocyanate.

In an embodiment, the PU foam reaction mixture applied to the carrier may comprise 1 part by weight of the color paste, 80 parts by weight of the polyol blend and 7 parts by weight of isocyanate.

In another embodiment, the PU foam reaction mixture applied to the carrier may comprise 3 parts by weight of the color paste, 100 parts by weight of the polyol blend and 14 parts by weight of isocyanate.

In another embodiment, the PU foam reaction mixture applied to the carrier may comprise 4 parts by weight of the color paste, 110 parts by weight of the polyol blend and 16 parts by weight of isocyanate.

In another embodiment, the PU foam reaction mixture applied to the carrier may comprise 7 parts by weight of the color paste, 115 parts by weight of the polyol blend and 18 parts by weight of isocyanate.

The mixing head 208 may be equipped to produce a desired mixing ratio of the first, second and third mixtures and means for injecting pressurized air ("PRES. AIR") to cause mechanical frothing of the foam polyurethane reaction mixture. The ratios of the various materials, reactants, and products and their distribution may be driven by computer assisted equipment and controlled centrally via CPU.

Addition of the RFS in an effective amount, allows stabilization of the foam, prevents settling out of the various additives, and adjusts the viscosity of the polyurethane reaction mixture 210 such that the polyurethane reaction mixture enters deeply into the tufts of artificial grass, and wets the textile carrier and the monofilaments contained therein for allowing better tuft bind with even less polyurethane material.

For example, in an embodiment, the thickness of the PU backing may be reduced, and may be at least 25%, preferably at least 30%, more preferably at least 40% less than the thickness of a conventional backing when all other parameters are kept the same except for the addition of the RFS in the PU foam reaction mixture.

With the inventive PU foam reaction formulation which includes the RFS the thickness of the PU backing may be as little as 0.1 mm.

In an embodiment, a polyethylene fiber artificial turf may be made with the inventive PU backing having a thickness of 2.0 mm and an adequate tuft bind of at least 10 Newtons, or at least 15 Newtons, or 20 to 30 newtons.

In an embodiment, a polyethylene fiber artificial turf may be made with the inventive PU backing having a thickness of 1.0 mm and an adequate tuft bind of at least 10 Newtons, or at least 15 Newtons, or 20 to 30 newtons.

In an embodiment, a polyethylene fiber artificial turf may be made with the inventive PU backing having a thickness of 0.5 mm and an adequate tuft bind of at least 10 Newtons, or at least 15 Newtons, or 20 to 30 newtons.

In an embodiment, a polyethylene fiber artificial turf may be made with the inventive PU backing having a thickness of 0.1 mm and an adequate tuft bind of at least 10 Newtons, or at least 15 Newtons, or 20 to 30 newtons.

The polyurethane reaction mixture 210 generated by the mixing head 208 is fed to a container 212 which may have the form of a hose. The container 212 (or chamber) has an opening 214 that leads to a coater, e.g., a "knife over roll" backing assembly as depicted, for example, in FIG. 3. Typically, the reaction mixture output by the mixing head 208 reaches the opening 214 being part of the backing assembly within 30 seconds. At this point, the polyaddition reactions resulting in the generation of the liquid polyurethane reaction mixture used for backing a carrier textile of a piece of artificial turf will largely have been completed already, but some reactions may still continue during the backing process.

According to an embodiment, the first polyol(s), (optionally the PBD) and the isocyanate in total constitute at least 25%, according to other embodiments at least 40%, or even more than 95% of the total amount of the total reaction mix used for generating the liquid polyurethane reaction mixture that—after a curing process—is used as the artificial turf backing. In a specific example, the reaction mixture comprises in weight percentages about 21.5% isocyanate, 0.5% PBD, 21.5% polyethylene glycol, 2.1% catalyst, 1.5% RFS, and 2.5% additives like dyes, flame retardants, and the remainder is filler material.

In another specific example, the reaction mixture comprises in weight percentages about 20% isocyanate, 0.1% PBD, 20% polyethylene adipate, 2.1% catalyst, 2.5% RFS, 2.0% additives like dyes, flame retardants, and the remainder is filler material.

In yet another specific example, the reaction mixture comprises in weight percentages about 20% isocyanate, 0.1% PBD, 20% polyethylene glycol, 2.1% catalyst, 7.0% RFS, 2.0% additives like dyes, flame retardants, and the remainder is filler material.

Figure 3:
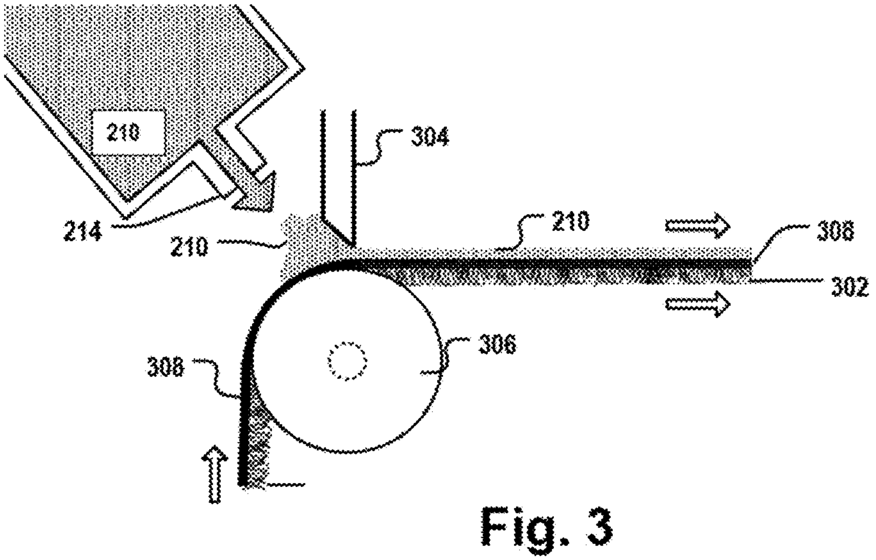
FIG. 3 illustrates a "knife over roll" polyurethane backing process, according to an embodiment of the present invention.

FIG. 3 illustrates a "knife over roll" polyurethane backing process and a corresponding backing assembly. The liquid, viscous reaction mixture 210, (also referred to as liquid polyurethane reaction mixture), upon leaving the opening 214 of the container 212, is applied on a carrier 308. A plurality of artificial turf fibers 501 protrude from the front side of the carrier. The liquid polyurethane reaction mixture 210 is applied on the back side of the carrier. The polyurethane reaction mixture is applied continuously while a roll 306 (also referred to as the carrier reel or drum) causes the carrier 308 to move in a direction indicated by the arrows. A "knife" 304 shown in cross section view is located at a defined distance above the carrier 308 and ensures that the viscous polyurethane reaction mixture 210 passing the space between the knife 304 and the carrier 308 has a defined height.

The high viscosity of the polyurethane reaction mixture, according to an embodiment, of the invention and the configuration and dimensions of the opening 214 and the speed of the polyurethane reaction mixture flow through this opening are chosen such that a defined amount of polyurethane reaction mixture builds up and accumulates on the front side of the knife 304. This ensures that the thickness of the polyurethane backing of the generated piece of artificial turf is constant. The presence of the RFS in the reaction mixture facilitates the controlling of the viscosity of the polyurethane mixture and stabilizes the foam so that a more homogeneous application of the reaction mixture is facilitated.

After the polyurethane reaction mixture 210 is homogeneously applied on the back side of the carrier 308, the polyurethane reaction mixture is hardened (increase of viscosity) by keeping the coated piece of artificial turf for about 10 minutes at room temperature. Typically, the polyurethane backing may become fully solid in only a few minutes, preferably less than two minutes after its application on the carrier.

In an embodiment, to speed up the solidification, the artificial turf once the polyurethane reaction mixture is placed on the back side of the artificial turf may be exposed to an elevated temperature around 100° C. Typically, after 90 seconds at elevated temperature, 90 to 95% of the polyurethane reaction mixture is "cured" (is in solid state). The heating may be performed, for example, in an oven. For example, the backing assembly, for example via the carrier drum may automatically transport the coated piece of artificial turf in an oven.

Figure 4:
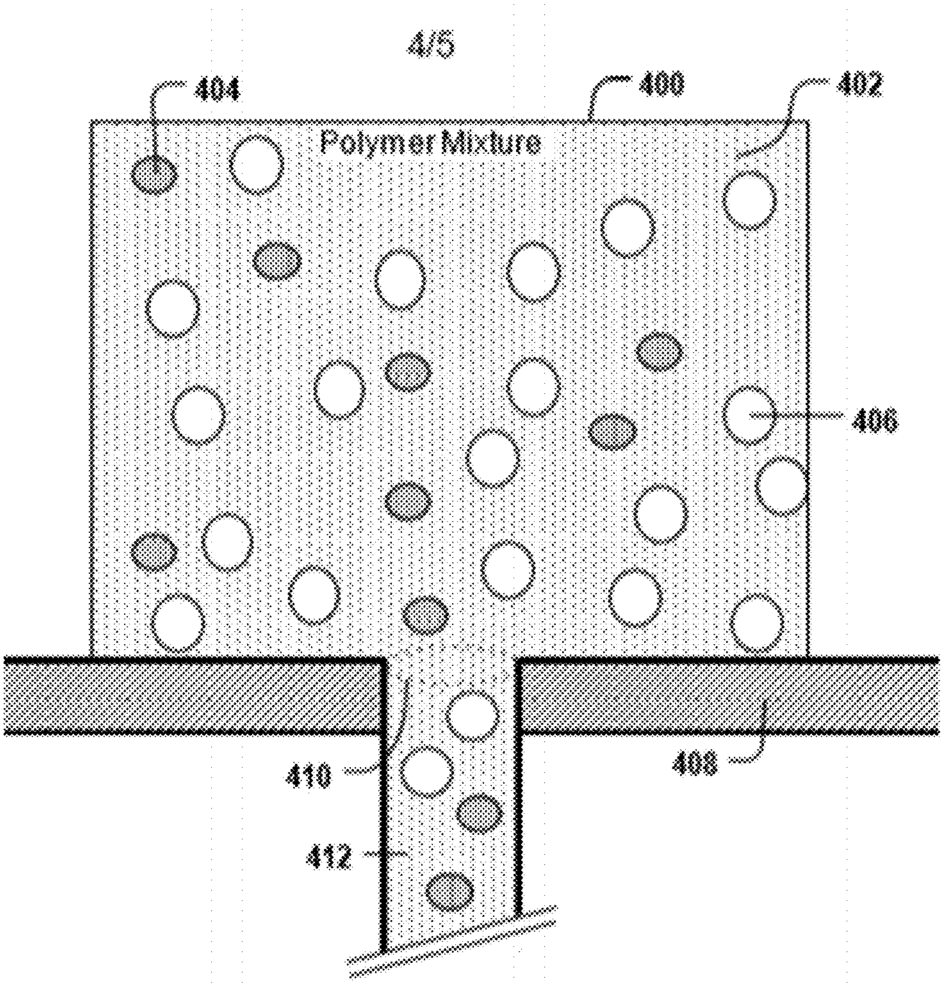
FIG. 4 illustrates the extrusion of a polymer mixture into a monofilament, according to an embodiment of the present invention.

FIG. 4 illustrates a liquid polymer mixture 400 for producing a monofilament 412 in an extrusion process. The polymer is a polyolefin, e.g., a polyethylene mixture. The polymer mixture 400 comprises additives 404, 406 such as UV-stabilizers, pigments, flame retardants or the like. A screw, piston or other device is used to force the polymer mixture 400 through a hole 410 in a plate 408. This causes the polymer mixture 400 to be extruded into a monofilament 412.

In an embodiment, the polymer mixture may comprise polymer beads of a more rigid polymer, e.g., polyamide. Due to flow dynamics during the extrusion process, the beads will tend to concentrate in the center of the monofilament 412. This may lead to a concentration of rigid, thread-like PA regions in the core region of the monofilament while the surface of the monofilament almost completely consists of the hydrophobic PE. Thus, a fiber with increased resilience is provided which has a soft PE surface that protects against injuries and skin burns which, however, has a very hydrophobic surface and may therefore easily detach from a polar polyurethane backing.

Thus, the monofilament is produced by feeding the polymer mixture 400 into a fiber producing extrusion line. The melt mixture is passing the extrusion tool, i.e., a spinneret plate or a wide slot nozzle, forming the melt flow into a filament or tape form, is quenched or cooled in a water spin bath, dried and stretched by passing rotating heated godet rollers with different rotational speed and/or a heating oven. The monofilament or fiber may later be annealed online in a second step passing a further heating oven and/or set of heated godet rollers.

According to an embodiment, manufacturing an artificial turf fiber (which may comprise one or more monofilaments 412 comprises forming the stretched monofilament into a yarn.

Multiple, for example 4 to 8 monofilaments, could be formed or finished into a yarn.

According to an embodiment, the extrusion is performed at a pressure of 40-140 bars, more preferably between 60-100 bars. The polymer mixture may be created by adding polymer granules to a solid polymer composition that is mixed and heated until all polymer is melted. For example, the polymer mixture may be heated to reach at the time of extrusion a temperature of 190-260° C., more preferably 210-250° C.

According to an embodiment, the stretching comprises stretching the reheated monofilament according to a stretch factor in the range of 1.1-8, more preferably in the range of 3-7.

According to an embodiment, the quenching is performed in a quenching solution having a temperature of 10-60° C., more preferably between 25° C.-45° C.

According to an embodiment, the incorporation of the artificial turf fiber into the carrier comprises tufting or weaving the artificial turf fiber into the carrier.

According to an embodiment, the quenching solution, e.g., a water bath, has a temperature (right after the extrusion nozzle or hole(s)) of 10-60° C., more preferably between 25° C.-45° C., and even more preferably between 32° C.-40° C.

According to an embodiment, the extrusion is performed at a pressure of 80 bar, the polymer mixture at time of extrusion has a temperature of 230° C., the stretch factor is 5 and the quenching solution, e.g., a water bath, has a temperature of 35° C.

Figure 5A:
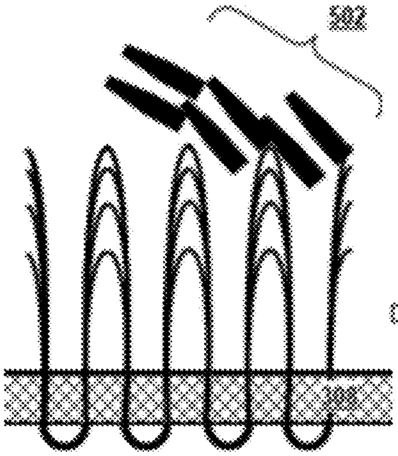
FIGS. 5*a* and 5*b* illustrate the tufting of an artificial turf fiber and illustrates first and second parts of the fiber, according to an embodiment of the present invention.
Figure 5B:
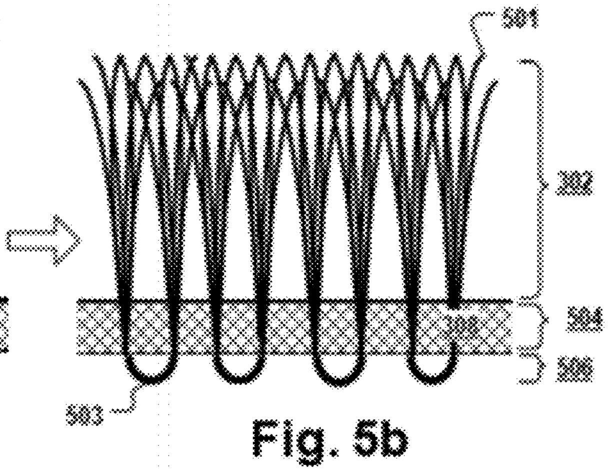

Referring to FIGS. 5*a*, and 5*b* the incorporating of the turf fiber 501 into the carrier 308 includes positioning the fiber 501 so that a first portion of the fiber 302 is protruding to the front side of the carrier (also referred to hereinafter as the front portion of the fiber), a second portion 506 of the fiber is located at the back side of the carrier (also referred to hereinafter as the back portion of the fiber), and a third portion of the fiber 504 is inside the carrier (referred to also as the middle portion of the fiber).

FIG. 5*a* illustrates the tufting of an artificial turf fiber and how a plurality of artificial turf fibers can be arranged in a carrier 308, e.g., a textile plane, by tufting. The carrier 308 may be a textile made of a hydrophobic polymer, e.g., PE. Tufting is a type of textile weaving in which an artificial tuft fiber 501 (that may be a monofilament 412 or a bundle of multiple monofilaments) is inserted on a carrier 308.

A "monofilament" as used herein is a filament generated by extruding a liquid polymer mixture through a single opening or is a slice of a polymer tape generated in accordance with the slit film technique.

After the inserting is done, as depicted in FIG. 5*a*, short U-shaped loops of the fiber point outside of the carrier's surface. Then, one or more blades cut 502 through the loops. As a result of the cutting step, two artificial turf fiber ends per loop and monofilament point out from the carrier and a grass-like artificial turf surface is generated as depicted in FIG. 5*b*. Thereby, first portions 506 of the monofilaments (corresponding to first portions of the artificial turf fibers)

which have been inserted in the carrier 308 are exposed to a bottom side (back side) of the carrier and second portions 302 of said monofilaments are exposed to a top side of the carrier. Some portions 504 of the monofilaments/fibers are located within the carrier. Fibers or fiber bundles may protrude in loops 503 outside of the back side of the carrier. The piece of artificial turf generated in the tufting process may be forwarded to the backing assembly depicted in FIG. 3 for applying the polyurethane reaction mixture 210 on the back side of the carrier.

Figure 6A:
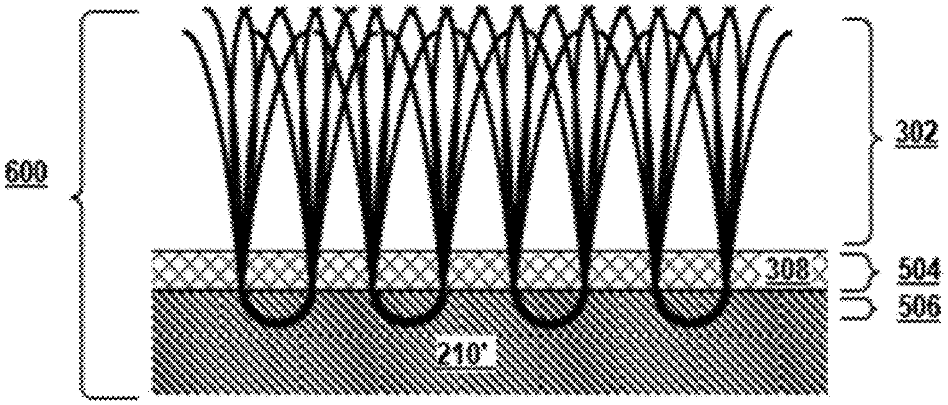
FIGS. 6*a* and 6*b* illustrate an artificial turf structure with portions of monofilaments and fibers embedded in a polyurethane backing, according to an embodiment of the present invention.
Figure 6B:
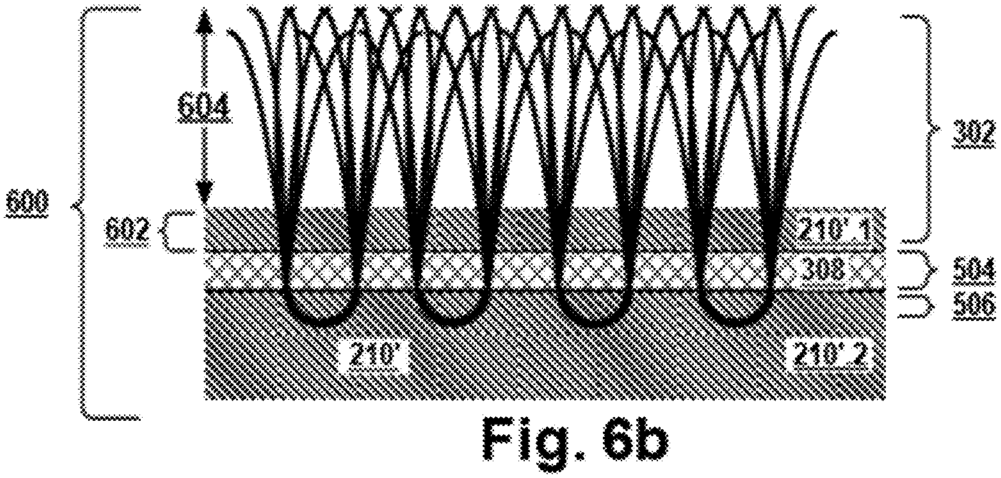

FIGS. 6*a* and 6*b* show portions of monofilaments and fibers which are embedded in the polyurethane backing. Reference number 600 refers to the total height of a piece of artificial turf having been coated with the polyurethane reaction mixture 210 generated According to an embodiment, of the invention.

FIG. 6*a* illustrates a piece of artificial turf made from a highly viscous polyurethane reaction mixture and/or with a close meshed carrier 308 that prevents the polyurethane reaction mixture from penetrating and transgressing the carrier 308. In this embodiment, second portions 302 of the fibers 501 protrude from the carrier 308 to the front side of the artificial turf and are not embedded in a polyurethane film as the liquid polyurethane reaction mixture 210 was not able to reach the front side of the carrier during the backing process. Also, the fiber portions 504 within the carrier are not wetted by the polyurethane reaction mixture in this embodiment. However, the back side portions 506 of the fibers are embedded in the liquid polyurethane reaction mixture 210 during the backing process. Although the length of these back side portions is comparatively small, the high hydrophobicity and the improved wetting of the fibers by the polyurethane reaction mixture 210 ensure that the fibers are firmly fixed by Van-der-Waals forces in the backing and that a slip stick effect further protects the fibers against tuft withdrawal forces. FIG. 8*b* illustrates a piece of artificial turf made from a less viscous polyurethane reaction mixture (compared to the embodiment of FIG. 6*a*) and/or with a wide-meshed carrier 308. The carrier may be a textile mesh or another type of material that comprises perforations that allow the polyurethane reaction mixture 210 to enter the carrier and reach the front side of the artificial turf. Thus, the front portion 302 of the fibers in FIG. 6*b* comprises an outer portion 604 which is not embedded in the polyurethane film 210 and an inner portion 602 which is embedded in the polyurethane film 210.2 which has entered the carrier. In addition, portions 504 and 506 are wetted by and are embedded in the liquid polyurethane reaction mixture 210. Thus, the carrier, portions of the fibers inserted in the carrier and further portions 602 of the fibers at the front side of the carrier may become embedded in the polyurethane backing in addition to the portions 506 on the back side of the carrier. This embodiment of FIG. 6B is advantageous in that the RFS containing PU foam reaction mixture penetrates through the carrier and can form a PU backing layer on the front side of the carrier as well. This may further increase the tuft bind.

The liquid polyurethane reaction mixture 210 added in the backing process on the back side of the carrier surrounds and thereby mechanically fixes at least some portions of the monofilaments of the arranged artificial turf fibers. Then, the liquid polyurethane mixture 210 solidifies into a polyurethane artificial turf backing 210' at room temperature or in an oven. The solid film acts as the artificial turf backing. In some examples, additional backing layers may be added on the bottom of the artificial turf backing.

EXAMPLES

As shown in Table 1 below, It has been found that small amounts of castor oil used as the RFS in the PU reaction mixture at amounts of 3.5 pphr (parts for hundred resin in Example 1) and 5.0 pphr (example 2) increase the tenacity and tear resistance of the PU backing. The percent elongation at 3.5 pphr increased compared to the reference and at 5.0 pphr was lowered near the value of the reference example. The reference example PU backing was prepared as described above with a PU reaction mixture comprising in weight percentages about 21.5% isocyanate, 0.5% PBD, 21.5% PEG, 2.1% catalyst, and 2.5% additives like dyes, flame retardants, and the remainder filler material (chalk).

TABLE 1

| | Tenacity [MPa] | SD | Elongation [%] | SD | Tear strength [N/mm] | SD |
|---|---|---|---|---|---|---|
| Reference Example | 5.28 | 1.58 | 31.3 | 9.3 | 61.4 | 4.2 |
| Ex. 1: 3.5 pphr Castor oil | 8.61 | 1.03 | 42.2 | 7.6 | 69.2 | 4.9 |
| Ex. 2: 5.0 pphr Castor oil | 10.06 | 1.12 | 34.8 | 8.4 | 70.8 | 5.3 |

Moreover, addition of the RFS over the color in the PU machine allows for appropriate dosing without changing the compounding process. Exemplary dosing rates are given in the following table 2:

TABLE 2

| Color dosing [parts/100 parts compound] | bio-based polyol in color [wt %] | bio-based polyol in PU [pphr] |
|---|---|---|
| 1.9 | 50 | 2.9 |
| 2 | 50 | 3.1 |
| 2.4 | 50 | 3.7 |
| 3 | 50 | 4.6 |
| 1.5 | 75 | 3.4 |
| 2 | 75 | 4.6 |
| 2.5 | 75 | 5.7 |

Process: Viscosity and Foam Stability

Importantly, addition of the RFS can be done without adjustment to production layout on all common machine. A benefit of adding the RFS is low viscosity during compounding and processing. In particularly, bio-polyols from castor oil or soybean oil have higher viscosity than comparable petrol-based polyols as it can be seen from the following Table 3 which includes examples of petrol-based polyols and bio-based polyols.

TABLE 3

| Polyol | Polyol Type | nominal functionality | OH Value | Viscosity |
|---|---|---|---|---|
| PPG2000 Diol | Petrol-based | 2 | 56.1 | 345 |
| PPG3000 Triol | Petrol-based | 3 | 55.5 | 160 |
| Castor Oil Polyol | Bio-based | 2.7 | 160 | 3500 |
| Soybean oil Triol | Bio-based | 3 | 112 | 720 |
| Soybean oil Diol | Bio-based | 2 | 110 | 720 |

High viscosity petrol-based components increase the viscosity of the compound mixture and, thus increase the load on the pumps during processing. By contrast, it has been found that using bio-based polyols over the color circumvents the associated viscosity increase during the processing. Moreover, the addition of the isocyanate preferably in the mixing head lowers the viscosity. Therefore, a late introduction of the bio-based polyol has no process related draw backs.

Hence, the addition of the RFS such as the castor oil, soybean oil and or polyols based on castor oil and/or soybean oil provides higher foam stability. More specifically, the higher viscosity is associated with the higher foam stability by hindering the foam to coalesce. Moreover, late addition of the RFS, preferably as part of the color paste, further improves the stability of the foam and allows proper mixing without increasing the compound viscosity.

It has been further found that mixing the RFS in the color paste with phthalocyanine green (Phthalocyanine green G) and/or phthalocyanine blue (also known as cupper phthalocyanine, phthalo blue, or CuPc), and preferably with the phthalocyanine green pigment is particularly advantageous because it prevents migration or leaching out of the pigment from the turf fiber. This effect is particularly pronounced with the phthalocyanine green pigment. It is postulated that this may be because phthalocyanine green contains many chlorine atoms which may create hydrogen bonds with the hydrogen atoms of the RFS thus creating a much bigger complex with reduced mobility in the fiber.

Figure 7:
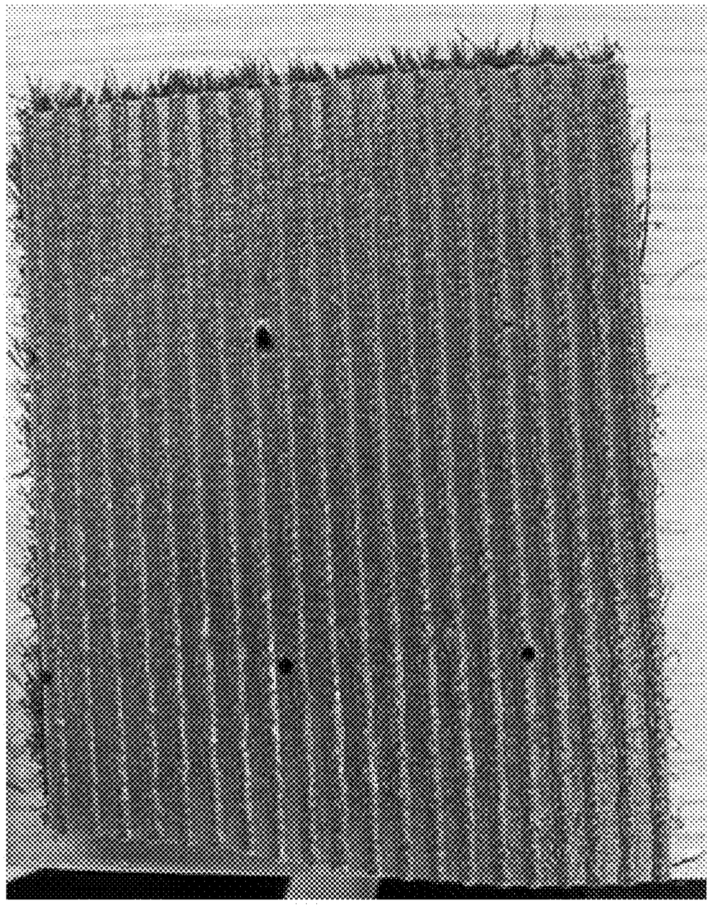
FIG. 7 shows a back-side of an artificial turf with a homogeneously colored secondary backing.

FIG. 7 shows the back-side of an artificial turf with a homogeneously colorized secondary backing. The pigment used for creating a petrol-like color comprised phthalocyanine green mixed with a bio-based polyol from castor oil. Using an RFS allowed to stabilize a homogeneous distribution of this pigment within the PU reaction mass until the secondary backing had cured completely.

Although the invention has been described in reference to specific embodiments, it should be understood that the invention is not limited to these examples only and that many variations of these embodiments may be readily envisioned by the skilled person after having read the present disclosure.

LIST OF REFERENCE NUMERALS

102-104-106-108-1022-1024-1026-1028-1029 method steps
201 first tank for first mixture
202 first mixture
203 second tank for second mixture
204 second mixture
205 third tank or container for third mixture
206 third mixture
208 mixing head
210 polyurethane reaction mixture
210' polyurethane backing with RFS
212 hose of backing assembly
214 opening of hose
302 fibers protruding from carrier
304 knife
306 roll
308 carrier, e.g., textile mesh
400 polymer mixture for fiber creation
402 hydrophobic fiber polymer
404 additive
406 additive
408 plate
410 opening of extrusion nozzle
412 extruded monofilament
501 artificial turf fiber
502 cutting step
503 fiber loop
504 fiber portion within carrier
506 fiber portion protruding to the back side of the carrier
600 artificial turf
602 fiber portion protruding to the front side of the carrier being embedded in the polyurethane reaction mixture
604 fiber portion protruding to the front side of the carrier not being embedded in the polyurethane reaction mixture
PU Polyurethane
RFS Reaction Foam Stabilizer

The invention claimed is:

1. A method for making an artificial turf, the method comprising:

providing a carrier and an artificial turf fiber incorporated into the carrier such that a first portion of the artificial turf fiber protrudes to a back side of the carrier, a second portion of the artificial turf fiber protrudes to a front side of the carrier, and a third portion of the artificial turf fiber is inside the carrier;

preparing a polyurethane (PU) foam reaction mixture containing a reactive foam stabilizer (RFS), wherein the RFS is a substance adapted to stabilize the PU foam reaction mixture; and applying the PU foam reaction mixture on the back side of the carrier to cover the artificial turf fiber protruding to the back side of the carrier and allowing the PU foam reaction mixture to cure to form a flexible PU backing securing the turf fiber in place.

2. The method of claim 1, wherein the RFS is bio-based and is at least one of the following substances:

a polyester polyol including a polyester diol or a polyester triol, based on soybean oil, and/or castor oil, and/or a fat in the form of an ester of a triol with a fatty acid including a triglyceride, a castor oil, or a soybean oil, wherein the RFS stabilizes the PU foam reaction mixture by increasing the viscosity of the PU foam reaction mixture via hydrogen bonding.

3. The method of claim 1, wherein the RFS is chemically modified for increasing the number of hydroxyl groups so that more covalent bonds are created with a PU matrix into which the PU foam reaction mixture has been reacted.

4. The method of claim 1, wherein the RFS is castor oil, soybean oil, a polyester polyol based on soybean oil, a polyester polyol based on castor oil, or a combination thereof.

5. The method of claim 1, wherein the preparing of the PU foam reaction mixture containing the RFS, includes first mixing the RFS with a color paste additive and then adding the color paste additive mix in the PU foam reaction mixture.

6. The method of claim 1, wherein the preparing of the PU foam reaction mixture containing the RFS, includes first mixing the RFS with a color paste additive and then adding the color paste additive mix in the PU foam reaction mixture before adding an isocyanate component of the PU foam reaction mixture in the PU foam reaction mixture for preventing an excessive increase in a viscosity of the reaction mixture, and wherein the color paste additive comprises 7% to 60% by weight color pigment, and 40% to 93% by weight RFS.

7. The method of claim 6, wherein the PU foam reaction mixture applied to the carrier comprises 1 to 9 parts by weight of the color paste, 70 to 120 parts by weight of a polyol blend comprising a polyol and a filler, and 7 to 21 parts by weight of the isocyanate component.

8. The method of claim 1, wherein the preparing of the PU foam reaction mixture further comprises adding in the PU foam reaction mixture a polyol blend comprising from 30 to 80 wt % filler and from 70 to 20 wt % polyol, and wherein the polyol comprises a polyether polyol and/or a polyester polyol having at least 2 hydroxyl groups per molecule.

9. The method of claim 8, further comprising adding a chain extender in an amount from 5 to 50 wt % of the polyol blend, the chain extender comprising at least one of monoethylene glycol, diethylene glycol, triethylene glycol, monopropylene glycol, dipropylene glycol, tripropylene glycol, 1,4-butanediol, 1,2,4-butanetriol, and 1, 4-cyclohexanedimethanol (CHDM).

10. The method of claim 9, wherein the polyol is at least one of polyethylene glycol (PEG), polypropylene glycol (PPG), polytetramethylene ether glycol (PTMEG), polyethylene adipate, polycaprolactone polyol, and polybutylene adipate terephthalate.

11. The method of claim 9, wherein the polyol comprises 85% polyethylene glycol 4000 Da.

12. The method of claim 9, wherein the polyol comprises 85% polyethylene glycol 2000 Da and 15% dipropylene glycol.

13. The method of claim 9, wherein the polyol comprises polypropylene glycol 450 to 6000 Da.

14. The method of claim 6, wherein the color pigment comprises phthalocyanine green and/or phthalocyanine blue.

* * * * *